F. W. BUTTERWORTH.
BRICKMAKING MACHINE.
APPLICATION FILED AUG. 19, 1915.
1,193,870.
Patented Aug. 8, 1916.
2 SHEETS—SHEET 1.
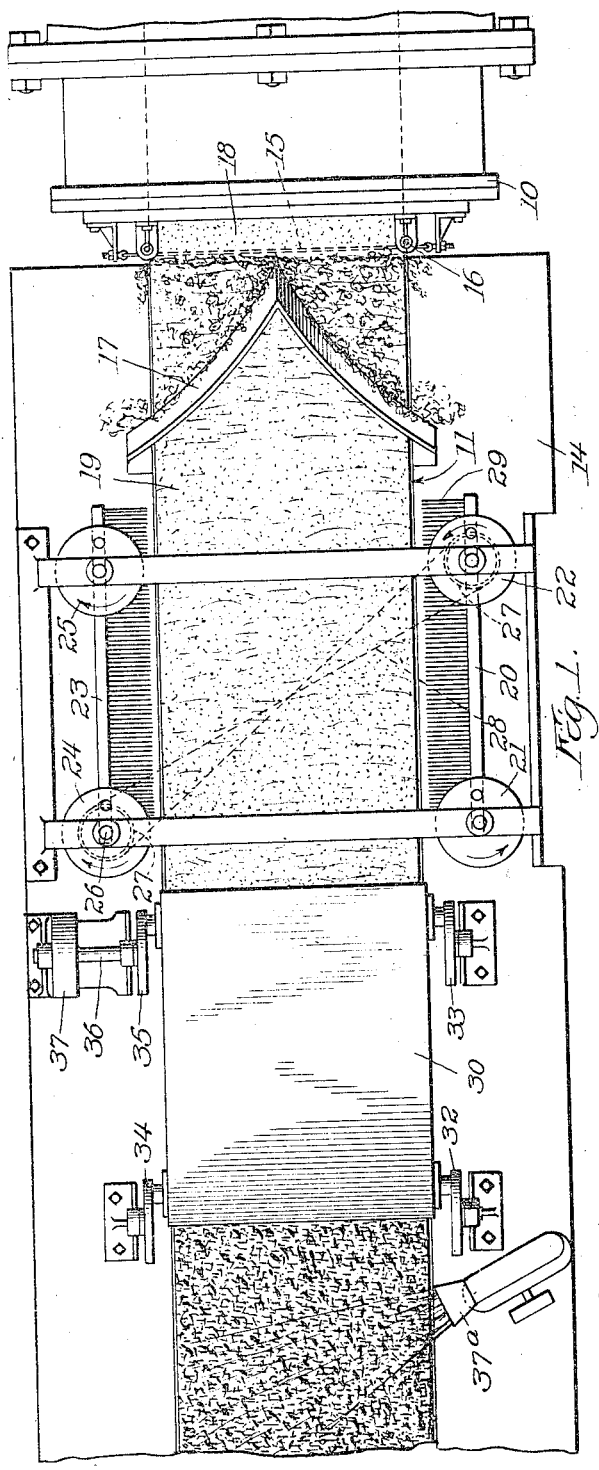
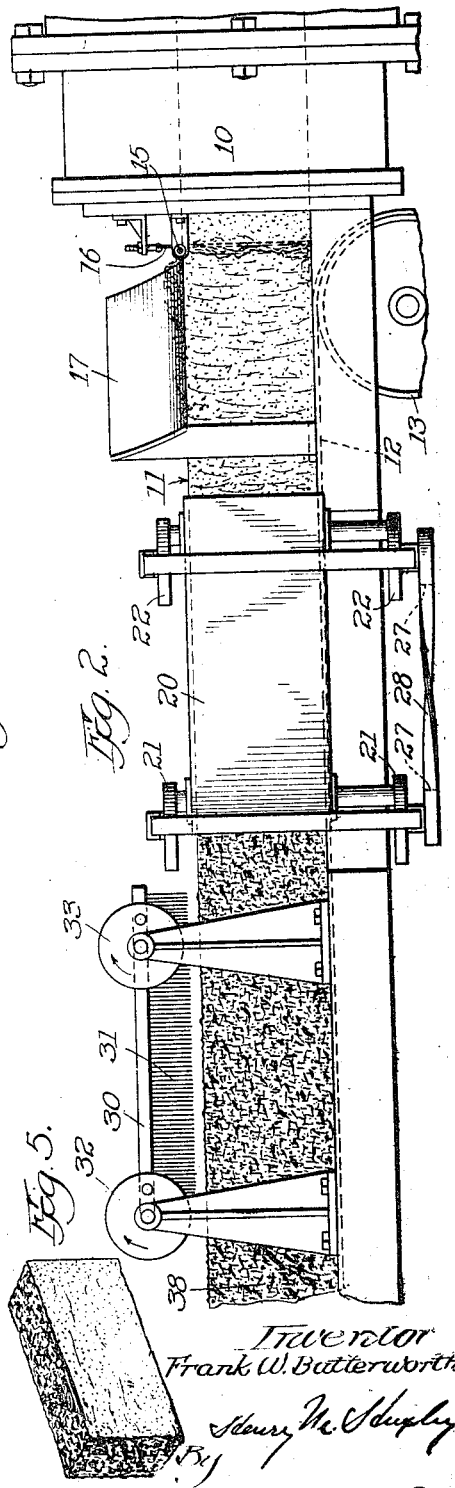
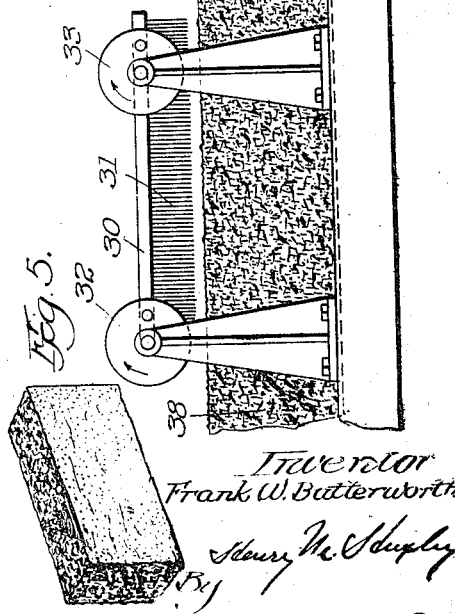
Inventor
Frank W. Butterworth

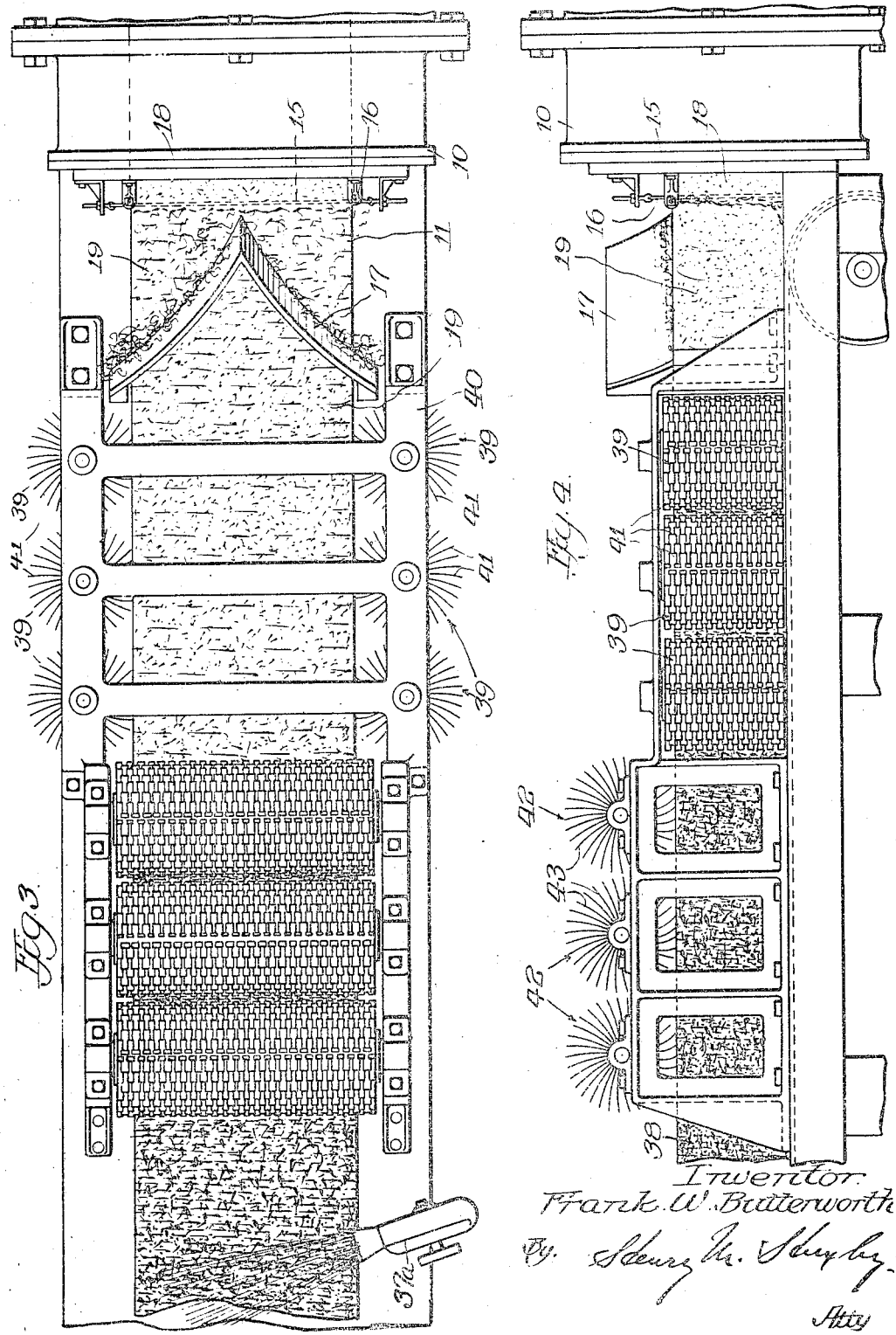

UNITED STATES PATENT OFFICE.

FRANK W. BUTTERWORTH, OF DANVILLE, ILLINOIS.

BRICKMAKING-MACHINE.

1,193,870.  Specification of Letters Patent.  Patented Aug. 8, 1916.

Application filed August 19, 1915. Serial No. 46,236.

*To all whom it may concern:*

Be it known that I, FRANK W. BUTTERWORTH, a citizen of the United States, residing at Danville, in the county of Vermilion, in the State of Illinois, have invented certain new and useful Improvements in Brickmaking-Machines, of which the following is a specification.

My invention relates to brick-making machines, and refers particularly to machines for treating the surfaces of the bricks.

It was formerly the custom to manufacture face bricks with a smooth surface, these bricks ordinarily having been made by molding. Subsequently, after the introduction of the so-called "stiff-mud" process, the bricks were manufactured by first extruding a ribbon of clay or the like through a die and subsequently cutting this ribbon into suitable lengths so that the individual bricks were formed. As a further refinement on this process, different methods were used for roughening the surface of the brick in order to give it a more attractive appearance. The simplest and earliest process for roughening brick consisted in removing from the clay-ribbon after it left the die a thin layer of material, this operation being accomplished by means of a wire adjacent to the mouth of the die. The degree of roughening could be varied to a considerable extent by the size of the wire employed. In the use of this process the surface of the brick while roughened was left with cracks extending in a direction transverse to the clay-ribbon, and this surface was very unsightly in the finished product. Moreover, in order to give a uniform appearance to a wall constructed with bricks of this nature it is necessary that each brick should be laid in a particular position in order to give the proper homogeneous effect to the wall as a whole. It will be evident that the necessity of laying all of the bricks in this way entails great additional labor on the part of a brick-layer.

Other processes of roughening the surface of bricks have consisted in scoring the clay-ribbon by the use of pins or the like, after which the furrows thus formed have been partially obliterated by further treatment, such as rolling the surface of the ribbon in order to partially flatten the material loosened by the furrowing action. The disadvantage of this process is that the finished bricks contain on their surface in a more or less clearly defined way series of lines which are unsightly, and, moreover, the clay which has been rerolled as it were, into the surface of the brick does not adhere firmly, with the result that the surface of the brick is very apt to crumble under varying weather conditions.

It is one of the objects of my invention to construct a machine which will produce bricks, or similar articles, which shall have a roughened surface without predominating lines extending in any direction, while at the same time the light effect produced on the brick shall be soft and light-absorbing rather than light-reflecting.

A brick produced by the machine of my invention may be laid in any position in a wall, and in whatever position it is laid will have the same appearance in so far as the effect of the light on the surface of the brick is concerned.

Further objects of my invention consist in producing a brick of the desired characteristics above mentioned and with a machine which shall be inexpensive and capable of producing bricks in large quantities.

Stated in general terms, my invention consists of a machine for making a brick having a roughened surface without predominating lines extending in any direction, and provided on its surface with a large number of minute indentations, which assist in giving the brick the desired qualities. The machine is used in connection with the ordinary "stiff-mud" process and has means for first preliminary roughening the surface of the clay-ribbon, and then subjecting it to a stippling action, the latter being preferably accomplished by means of brushes having resilient bristles of wire or the like thereon. By means of this stippling action the preliminarily roughened surface of the brick is brought into the desired condition by which all traces of cracks or lines are removed, while the minute indentations made by the brushes further assist in giving the desired appearance.

These and other advantages of my invention will be more readily understood by reference to the accompanying drawings, which show preferred embodiments of my improvements, and in which—

Figure 1 is a plan of my improved brick making machine; Fig. 2 is a side elevation of the machine shown in Fig. 1; Fig. 3 is a plan of a modified form of machine; Fig. 4 is a side elevation of the machine shown in Fig. 3; and Fig. 5 is one of the improved bricks produced by the use of my invention.

I will first describe the machine shown in the embodiment of my invention as illustrated in Figs. 1 and 2. A brick-press of any well-known type is provided with the die 10, from which is pressed the clay-ribbon 11, which is received on the endless conveyer-belt 12, which passes around sheaves or pulleys 13, one of which is shown in Fig. 2. A table or platform 14 is provided which has a surface approximately at the level of the upper surface of the conveyer-belt 12.

A horizontal wire 15 and the two vertical wires 16 are provided near the mouth of the die 10, the horizontal wire 15 serving to remove a thin layer from the upper surface of the ribbon 11, and the wires 16 performing a similar function with reference to the sides of the clay-ribbon. The plow-shaped member 17 supported on the table or platform 14 serves to remove from the upper surface of the clay-ribbon the layer of material shaved therefrom by the wire 15. The clay-ribbon 11 as it leaves the die 10 has a smooth surface, as indicated in the portion 18 of the ribbon. The wires 15 and 16, however, serve to roughen the surface of the ribbon, in the manner shown in the portion 19 of said ribbon, a number of more or less fine transverse cracks being formed in this surface.

The brush 20 having eccentric pivotal connections with the rotatable disks 21 and 22 is located at one side of the clay-ribbon 11, and a similar brush 23 having eccentric pivotal connections with the disks 24 and 25 is located at the other side of said ribbon. The shafts on which the lower disks 22 and 24 are mounted also have mounted thereon pulleys 27, which are connected with each other by a suitable crossed-belt 28. One of these shafts is connected with a suitable source of power (not shown in the drawings) so that the disks 21, 22, 24 and 25 may be simultaneously rotated in the direction indicated by the arrows in Fig. 1. Each of the brushes 20 and 23 is provided with bristles 29, these bristles being resilient and preferably formed of tempered flat steel wire.

It will be evident that as the disks with which the brushes 20 and 23 are connected rotate, the brushes are moved into engagement with the sides of the clay-ribbon and then travel in the same direction of movement as that in which the clay-ribbon itself is traveling, after which the bristles are disengaged and the rotation of the disks brings the brushes back to their original position by moving them in a direction opposite to that of the travel of the clay-ribbon while the bristles of the brushes are disengaged from the latter. During the engagement of the sides of the clay-ribbon by the bristles the brushes preferably travel very slightly faster or very slightly more slowly than the ribbon itself is traveling, the resiliency of the bristles causing the latter to be bent by the difference in rate of travel but not causing the bristles to be drawn over the surface of the ribbon so that any lines or markings are formed. By this slight bending of the bristles of the brushes, when the latter are nearly disengaged from the clay-ribbon the resiliency of the bristles causes them to become straightened with a snap, and a minute amount of clay is "picked", as it were, from the surface of the clay-ribbon, while at the same time the impact of the brushes with the surface has caused a further general roughening of the latter, the transverse cracks formed by the wires 15 and 16 are entirely obliterated. Minute indentations enlarged at their outer ends are left in the surface of the clay-ribbon by reason of the action of the bristles penetrating the surface and performing thereon a "picking" action as they leave their engagement with the clay-ribbon.

A brush 30 carrying the bristles 31, similar to the bristles 29 above mentioned, is adapted to engage the upper surface of the clay-ribbon 11 in the same manner that the brushes 20 and 23 engage the sides of this ribbon. The brush 20 is eccentrically pivotally connected at its corners with the disks 32, 33, 34 and 35, these disks being suitably mounted for rotation, and the disk 35 having connected therewith the shaft 36 on which is mounted the driving pulley 37, so that the disks may be rotated in the direction indicated by the arrows in Fig. 2. The action of the engagement of the bristles 31 of the brush 30 with the upper surface of the clay-ribbon is exactly the same as described in connection with the engagement of the bristles of the side brushes 20 and 23 with the sides of the ribbon. The particles of clay which are "picked" from the sides of the ribbon fall from the ribbon by their own weight, whereas the particles "picked" from the upper surface of the ribbon by the action of the brush 30 remain on the surface of the ribbon. These particles of clay may be removed by any suitable means, but I prefer to employ a blower 37ª, which effectually blows these particles away from the upper surface of the ribbon without affecting the texture of this surface. After the clay-ribbon 11 has been subjected to the action of the side brushes 20 and 23 and the upper brush 30, the appearance of the surface of the clay-ribbon is as indicated in its portion 38. After the operations just described have been completed, the clay-ribbon is cut into bricks by wire or other suitable means, according to the well-known process, thereby forming a plurality of bricks, one of which is indicated in Fig. 5.

It will be evident from the above description of the apparatus which I employ that in the operation of the same, as here specifically described, the clay-ribbon 11 is first forced from the die 10, and then has removed from its upper surface and sides thin layers of material by means of the wires 15 and 16, the material thus removed from the upper surface of the brick being carried away from the surface by means of the plow 17.

The upper surface and sides of the clay-ribbon, which have thus been preliminarily roughened and from which the hard skin formed by the die has been removed, are next subjected to the stippling action of the side brushes 20 and 23 and the upper brush 30, the bristles of which remain in contact with the surface of the clay-ribbon, while the brushes travel in the same direction as the ribbon and at a slightly different speed therefrom, so that the resilient bristles are bent, whereby on disengagement of the bristles from the surface a "picking" action removes small particles of clay from the ribbon. The loose particles of clay on the upper surface of the ribbon are then removed by blowing, or other similar means, after which the clay-ribbon is cut into the bricks, which are then subsequently calcined to form a finished article.

In Figs. 3 and 4 I have shown a modified form of machine. Instead of using flat brushes I employ the rotary side brushes 39, which are mounted on shafts carried by a suitable framework 40. The bristles 41 of these brushes are engaged by the sides of the ribbon 11, so that the travel of the ribbon itself causes the brushes to be rotated, and during this rotation the bristles 41 which are actually in engagement with the sides of the ribbon 11 are bent, so that when an individual bristle is almost disengaged from the surface of the clay-ribbon the resiliency of the bristle causes the bristle to straighten out and perform the "picking" operation above described. In order that the "picking" may throw the small particles of clay in the direction in which the ribbon is traveling, I prefer to have the bristles 41 made with a slight permanent bend; otherwise, upon engagement of the end of a bristle by the clay-ribbon its curvature would be formed in the opposite direction from that which is represented in the drawings, and the subsequent "picking" action would not be as effective.

The top brushes 42 are similar to the side brushes 39, and are rotated by engagement of the bristles 43 of these brushes with the upper surface of the clay-ribbon 11. If desired, the side brushes 39 and the top brushes 42 may be provided with brakes so that they will have a greater lag when their bristles are engaged by the clay-ribbon. In this way the bending of the individual bristles and the "picking" action may be increased, but it will be apparent that the braking action must not be so great that the brushes will not be readily rotated by the action of the clay-ribbon, as otherwise the bristles of the brushes would simply score the surface of the clay-ribbon with longitudinal lines and would not perform the stippling action, which is characteristic of my invention.

It will be apparent to those skilled in the art that many changes could be made in the details of my invention without departing from the spirit thereof, as defined in the appended claims.

What I claim is:

1. In apparatus for making bricks or the like, the combination of a forming-die, means for forcing ceramic material through said die to form a ribbon, means for conveying said ribbon from said die, and resilient stippling means movable in the same direction as said ribbon and adapted to be brought into engagement with the surface thereof.

2. In apparatus for making bricks or the like, the combination of a forming-die, means for forcing ceramic material through said die to form a ribbon, means for conveying said ribbon from said die, and stippling means having a plurality of resilient members thereon adapted to be brought into engagement with the moving surface of said ribbon.

3. In apparatus for making bricks or the like, the combination of a forming-die, means for forcing ceramic material through said die to form a ribbon, means for conveying said ribbon from said die, and a brush movable in the same direction as said ribbon and having resilient bristles thereon adapted to be brought into engagement with the surface of said ribbon.

4. In apparatus for making bricks or the like, the combination of a forming-die, means for forcing ceramic material through said die to form a ribbon, means for conveying said ribbon from said die, means for removing a layer of material from the surface of said ribbon, and resilient stippling means for forming minute indentations in the surface of said ribbon from which said layer has been removed.

5. In an apparatus for making bricks or the like, the combination of a forming-die, means for forcing ceramic material through said die to form a ribbon, wires located at the mouth of said die for removing thin layers of material from the upper surface and sides of said ribbon, means for conveying said ribbon away from said die, and brushes having resilient bristles adapted to be brought into engagement with the upper surface and sides of said ribbon, said brushes being movable in the direction of travel of said ribbon.

6. In an apparatus for making bricks or the like, the combination of a forming-die, means for forcing ceramic material through said die to form a ribbon, wires located at the mouth of said die for removing thin layers of material from the upper surface and sides of said ribbon, means for conveying said ribbon away from said die, brushes having resilient bristles adapted to be brought into engagement with the upper surface and sides of said ribbon, said brushes being movable in the direction of travel of said ribbon, and means for removing loosened material from the upper surface of said ribbon.

7. In an apparatus for making bricks or the like, the combination of a forming-die, means for forcing ceramic material through said die to form a ribbon, wires located at the mouth of said die for removing thin layers of material from the upper surface and sides of said ribbon, means for conveying said ribbon away from said die, a flat brush carrying resilient flat steel bristles, and means for moving said brush in the direction of movement of said ribbon and bringing said resilient bristles into engagement with the surface of the ribbon.

8. In an apparatus for making bricks or the like, the combination of a forming-die, means for forcing ceramic material through said die to form a ribbon, means for conveying said ribbon away from said die, brushes having resilient bristles adapted to be brought into engagement with the surface of said ribbon, said brushes being movable in the direction of travel of said ribbon, and means for removing loosened material from the upper surface of said ribbon.

9. In an apparatus for making bricks or the like, the combination of a forming-die, means for forcing ceramic material through said die to form a ribbon, means for conveying said ribbon away from said die, a flat brush carrying resilient bristles thereon, and means for moving said brush in the direction of movement of said ribbon and bringing said resilient bristles into engagement with the surface of the ribbon.

10. In an apparatus for making bricks or the like, the combination of a forming-die, means for forcing ceramic material through said die to form a ribbon, means for conveying said ribbon away from said die, a brush carrying resilient bristles thereon, and means for moving said brush in the direction of movement of said ribbon but at a different speed from the speed of said ribbon and bringing said resilient bristles into engagement with the surface of the ribbon.

11. In a brick-making machine, the combination of a conveyer adapted to carry a ribbon of ceramic material through said machine, a stippling brush, means for carrying said brush, actuating means for moving said brush toward and away from said ribbon, and means for maintaining said brush-carrying means in alinement with respect to said ribbon.

12. In a brick-making machine, the combination of a conveyer adapted to carry a ribbon of ceramic material through said machine, a stippling brush adapted to engage the surface of said ribbon, means for carrying said brush, rotatable means for moving said brush-carrying means toward and away from the surface of said ribbon, and means for automatically maintaining said brush-carrying means in alinement with respect to said ribbon.

In witness whereof, I hereunto subscribe my name this 16th day of August, A. D., 1915.

FRANK W. BUTTERWORTH.

Witnesses:
MARGARET CARNEY,
EDNA D. SCHROEDER.